INVENTOR.
Frank A. Gauger
BY
Arthur R. Woodford
ATTORNEY.

July 16, 1940. F. A. GAUGER 2,207,978
AUTOMATIC VALVE AND SYSTEM OF CONTROL THEREFOR
Original Filed Aug. 24, 1935 2 Sheets-Sheet 2
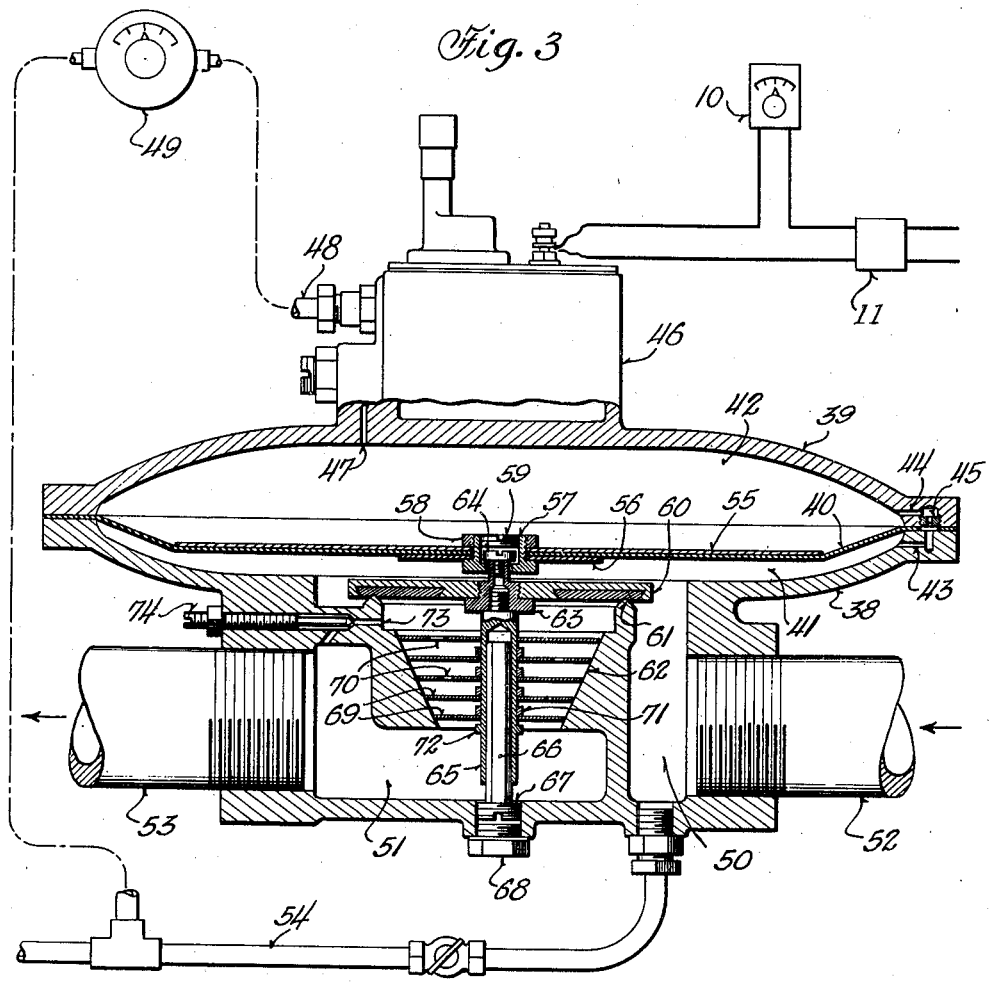
INVENTOR.
Frank A. Gauger
BY
Arthur R. Woolfort
ATTORNEY.

Patented July 16, 1940

2,207,978

UNITED STATES PATENT OFFICE 2,207,978

AUTOMATIC VALVE AND SYSTEM OF CONTROL THEREFOR

Frank A. Gauger, Milwaukee, Wis., assignor to Minneapolis-Honeywell Regulator Company, Minneapolis, Minn., a corporation of Delaware Application August 24, 1935, Serial No. 37,673
Renewed April 13, 1939

34 Claims. (Cl. 236—84)

This invention relates to an automatic valve and system of control therefor.

Objects of this invention are to provide a novel form of automatic valve which has a quick opening and a quick closing motion and which has a throttling motion through a substantial range of motion of the mechanism.

In greater detail, objects of this invention are to provide an automatic valve in which the throttling assembly is distinct and separate from the main valve, in which the main valve cuts off the gas entirely when it is closed, and in which the main valve cuts the gas off from the throttling assembly or throttling mechanism when the main valve is closed, so that the throttling assembly is out of the range of the gas pressure.

Further objects of this invention are to provide an automatic valve which cannot smother out a pilot light and which although having a quick opening, providing a substantial flow of gas whenever called for, nevertheless so controls this initial substantial flow of gas that it does not rush in and snuff out the pilot but is of sufficient quantity to prevent back-firing under all conditions.

In greater detail, objects of this invention are to provide an automatic valve in which the throttling, as stated, does not occur in a very limited range of motion but occurs for a relatively wide range of motion, and in which the throttling is gradual throughout this wide range of motion of the mechanism, one form that the invention may take having for its object to provide a throttling assembly which throttles in graded or graduated steps, and in another form that the invention may take in which the throttling is not in steps but has a uniform change throughout the entire range. In all forms, however, the automatic valve provides a gradual throttling throughout the major portion of the range of its operating mechanism so that no extremely fine adjustment is needed.

Further objects are to provide a novel form of automatic valve and system therefor in which the main valve may be controlled by an electrical system under the control of a thermostat, and in which the valve may be either additionally or separately controlled by one or a plurality of gas thermostats, in which these gas thermostats may be located at widely spaced points and each individually causing closing of the valve, in which each of the gas thermostats may be set to control at its individual temperature setting.

Further objects are to provide a construction in which the electrical equipment may be dispensed with and the valve may be controlled manually or may be locked open manually and may be automatically controlled solely by the gas thermostats or other throttling thermostats.

A further object of this invention is to provide a construction in which a minimum flame adjustment is provided and may be made for any number of burners, one, two or three, or, in fact, any desired number. The minimum flame as well as the entire gas flow is controlled by the main valve and is completely cut off when the main valve is closed.

Further objects are to provide a construction which although having all of the features hereinabove enumerated, is nevertheless simple, which is very easy to produce, and which does not require careful and elaborate adjustment, but which, on the other hand, is substantially foolproof and relatively rugged in its construction.

In general, this invention is an improvement over that disclosed in my copending application Serial No. 9,744 for Automatic valve and system of control therefor, filed March 7, 1935, which has matured into Patent No. 2,112,397, issued March 29, 1938.

Embodiments of the invention are shown in the accompanying drawings, in which:

Figure 3 is a vertical sectional view through a further form of the device.

Figure 4 is a fragmentary view, partly in section, showing the throttling assembly fully opened.

Figure 5 is a view corresponding to Figure 4 showing the throttling assembly almost completely closed.

Figures 1, 2:
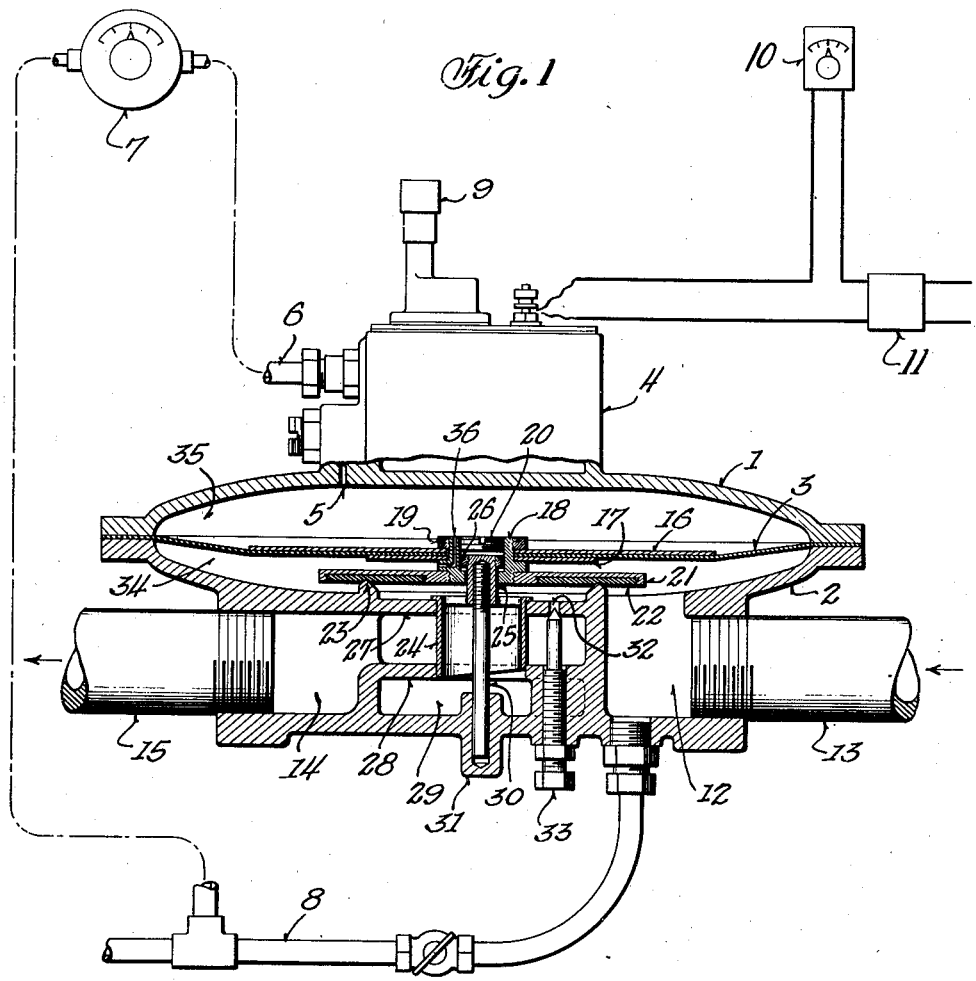
Figure 1 is a vertical sectional view through the device, with parts broken away.
Figure 2 is a fragmentary sectional detail of a modified form.

Referring to Figure 1, it will be seen that the automatic diaphragm valve comprises upper and lower casing members 1 and 2 between which a diaphragm 3 is clamped. The upper casing member carries an auxiliary gas tight casing 4 into which an outlet or exhaust bleed opening 5 leads. From the auxiliary casing 4 a discharge pipe 6 extends and leads either directly to the pilot line or to the combustion chamber or else, as shown in the drawings, leads through one or more gas thermostats 7. The discharge pipe from the gas thermostat may discharge into the furnace chamber or may discharge into the pilot light line 8, as indicated diagrammatically in Figure 1.

The auxiliary casing 4 houses a combination automatic electromagnetic valve having a manual control 9 projecting from the casing so that the discharge or bleed opening 5 may be controlled either automatically or manually.

This automatic electromagnetic relay or valve is described in detail in my above noted copending application. The electromagnetic relay may be controlled from a thermostat 10 and supplied from a step down transformer 11 in the usual manner.

The body portion or casing is provided with an inlet chamber 12 supplied from the inlet pipe 13 and an outlet chamber 14 connected to the outlet pipe 15. The diaphragm has an upper plate 16 and a relatively small lower plate 17 clamped thereto by means of a small cup-shaped fitting 18 provided with a clamping nut 19. The cup-shaped interior of this fitting is closed by means of a screw threaded plug 20. This fitting is screwed into and carries the main valve 21, such valve being provided with a gasket 22, if desired. The main valve includes an annular valve seat 23 formed integrally with the lower portion 2 of the casing, as clearly shown in the drawings.

A throttling valve 24 in the form of a cylindrical balanced valve is provided with a headed projecting portion 25 which loosely slidably passes into the fitting 18, the head 26 of such plunger like extension of the throttling balanced valve 24 being also freely slidably within the fitting 18 for a limited extent so that relative motion is permitted between the main valve 21 and the throttling valve 24. The throttling valve slides through the transverse upper flange 27 and the transverse lower flange 28. Below the lower flange 28 a cavity 29 is merely a dead space. The balanced valve 24 is preferably provided with an upper flange, as shown, to limit its downward motion. It is also provided with a guiding pin 30 which is slidably guided within the boss 31 of the body portion. The lower edge of the throttling valve 24 is bevelled so that there is a gradual opening and closing as the valve slides upwardly or downwardly.

A minimum supply opening 32 is provided and is controlled by a screw threaded needle plunger member 33 which is locked in place when the desired minimum adjustment has been obtained. This minimum adjustment may be set for one, two, three, or any number of burner sections and is sufficient to prevent flashing back of the burner.

It is to be noted at this point that the main valve when closed, cuts off the gas supply to both the throttle valve and to the minimum flame adjustment. In other words, these members are both out of the gas pressure range.

It is to be noted particularly that this automatic valve may be controlled either from the thermostat 10 or may be controlled from the gas thermostat or thermostats 7. If the gas thermostats are to take the entire control, the electromagnetic relay is manually locked open. Obviously, the gas thermostat line could connect directly to the upper casing 1 if it was never intended that an electromagnetic control should be employed.

It is apparent that gas pressure will form in the lower compartment 34 of the casing below the diaphragm. In order that gas pressure may form in the upper compartment 35 above the diaphragm, a restricted feeding bleed 36 is formed in the fitting 18 and allows gas to pass from the lower compartment 34 to the upper compartment 35 and thus balance the pressure. Under these conditions the main valve will close. However, if the thermostat, whether electrical or gas thermostat, calls for more heat, the pressure in the upper compartment 35 is relieved and consequently the pressure in the lower compartment raises the diaphragm.

The valve opens with a quick motion for it is apparent that as the pressure above the diaphragm is relieved, there comes a point when the pressure below the diaphragm is sufficient to lift the main valve from its seat. At this instant the pressure below the main valve suddenly increases and consequently the valve executes its opening motion quickly. This raises not only the main valve but also opens the throttle valve.

Assume now that the thermostat commences to throttle off, for instance one of the gas thermostats 7. Under these conditions the discharge through the relief bleed 5 is lessened and consequently some pressure builds up above the diaphragm and the main valve moves towards closed position. However, before the main valve is anywhere near closed position, the throttling valve comes into action and throttles down the gas supply in a gradual or graduated manner. As the pressure above the diaphragm increases, still more throttling occurs. There is always sufficient area around the margins of the main valve seat to more than supply the necessary volume of gas for the throttle valve and consequently the throttle valve has control of the gas flow.

Assume now that still more throttling occurs at the gas thermostat. The throttle valve, of course, more nearly closes and throttles the supply of gas to the burners still more. The throttle valve may completely close, if the demand is of this nature, and yet the minimum flame adjustment will still supply sufficient gas to the burner to maintain a minimum flame. If, however, this minimum flame is still more than is needed, the main valve will completely close with a quick motion, for at the instant it is very nearly closed, the pressure below the main valve is reduced approximating outside air pressure and therefore an additional force is available above the main valve and not balanced by any compensating force beneath the main valve. Consequently the main valve will quickly close.

Thus it is apparent that the main valve has a quick opening and a quick closing motion and that between these opening and closing positions throttling is effected by a throttle valve, and that this throttle valve operates throughout a very wide range of motion of the diaphragm. It, therefore, does not have to have a very fine adjustment but, as stated, the throttling is through a large range of motion and consequently is very smooth and free from any possible fluttering, although there may be variation in gas pressure.

It is obvious that the invention may take other forms. For example, as shown in Figure 2, instead of providing a minimum flame adjustment, the balanced valve 24' may have its pin 30' arrested by an adjusting screw 37 which is threaded into the boss 31' and limits the downward motion of the balanced valve.

In Figure 3 a further form of the invention is disclosed which provides a main valve and a throttle valve and a minimum flame adjustment, as previously described. In this form the casing is composed of a lower casing member 38 and an upper casing member 39 between which the diaphragm 40 is clamped. The supply bleed opening between the lower compartment 41 and the upper compartment 42 is provided by the communicating ducts 43 and 44 formed in the lower and upper casing members 38 and 39. A small plug 45 is screwed into one or the other of these casing members and is provided with a small aperture to thus provide a restricted opening and thereby accurately determine the amount of feed or rate of feed of gas from the lower compartment 41 to the upper compartment 42.

Similarly to that form of the invention previously described, the upper casing member 39 is provided with a gas tight casing 46 which houses the automatic electromagnetic relay with its manual control. The exhaust bleed opening 47 opens into the upper compartment and the outlet from the casing 46 indicated at 48 leads to one or more gas thermostats 49, exactly as previously described.

The body portion is provided with an inlet compartment 50 and an outlet compartment 51 respectively connected with the inlet pipe 52 and the outlet pipe 53. The pilot supply line 54 opens into the inlet compartment 50, as shown in Figure 3.

The diaphragm is provided with an upper disk 55 and a lower disk 56. The lower disk may be smaller than the upper disk, as indicated. The same general type of cup-shaped fitting as that previously described is employed in this form of the invention and is indicated by the reference character 57. It passes through the disks and diaphragm and a clamping nut 58 is provided. A screw threaded plug 59 closes the cup-shaped aperture within the fitting 57. The main valve is indicated at 60 and includes an annular valve seat 61. A tapered valve seat 62 is also provided and located below the annular valve seat 61. The main valve has a fitting 63 screwed thereinto and provided with a projecting reduced portion loosely passing into the fitting 57. A headed screw 64 is carried by the member 63 and thus the member 63 constitutes in effect a headed member loosely coupled to the fitting 57. A tubular slide 65 is carried by the member 63 and projects downwardly therefrom and loosely rides on a hexagonal guide member 66 provided with a screw threaded portion 67 screwed into the bottom of the body portion, a closing plug 68 being provided. Thus the member 65, it will be seen, is guided by the edges of the hexagonal.

The member 65 is loosely passed through a plurality of throttling disks 69 of gradually increasing diameter. These throttling disks are each provided with one or more holes indicated at 70 and these holes are of gradually increasing size from the lowest disk to the uppermost disk. A plurality of washers or spacers 71 are loosely positioned between successive disks and are of materially less thickness than the distance between the successive disks when the disks are seated on the tapered valve seat 62. Below the lowermost disk a collar 72 is formed rigidly with the sleeve like member or stem 65.

It is obvious that when the diaphragm rises its full extent, that it will lift all of the disks clear of the valve seat as indicated in Figure 4. However, if the rise of the diaphragm is only a small amount, it will first fully open the main valve and thereafter lift the lowermost disk, as indicated in Figure 5. Obviously, any intermediate position of the diaphragm will lift one or more additional disks so that there is a gradual or graduated opening produced by this throttle valve.

Additionally it is to be noted that a minimum flame adjustment is provided, the ducts 73 leading from beneath the main valve to the outlet chamber 51 being controlled by screw threaded needle valve 74, such valve being locked in position after it has been adjusted for the minimum flame for the requisite number of burners, as previously described.

It is to be noted also that when the main valve is fully closed, all gas pressure is cut off from the throttling valve as well as from the minimum supply adjustment.

The operation of this valve is as follows:

Assume that the thermostat 10 or a gas thermostat calls for an increase in temperature. The pressure above the diaphragm is relieved and the diaphragm tries to lift the main valve 60 from its seat. Finally, when the pressure below the diaphragm is sufficiently greater than the pressure above the diaphragm, the main valve 60 is lifted from its seat and this action is a quick motion as immediately upon the breaking of the seal between the main valve and the seat, pressure forms below the main valve and thus an additional upward thrust is suddenly provided, thereby producing a quick opening motion of the main valve.

In this quick opening motion after the main valve is actually opened, the diaphragm immediately encounters the additional load of one or two of the throttling disks or component parts of the throttling valve assembly. Consequently the diaphragm does not fully open the throttle valve with a complete full opening motion. Instead it partially opens this throttle valve. This is a great advantage as it prevents the snuffing out of a pilot light by a sudden rush of gas to the burner. This effect is noticed even with artificial gas but is very pronounced with natural gas.

If the pressure is completely relieved above the diaphragm, the diaphragm moves to its uppermost position and lifts all of the disks of the throttle valve assembly. If a lesser temperature is required, the diaphragm settles and the uppermost disk first seats, the remaining disks being held free of engagement with the tapered valve seat. This uppermost disk has the largest opening. However, if a still lesser temperature is called for, the diaphragm settles still farther and the next disk adjacent the uppermost disk engages the tapered valve seat. This disk has an opening therethrough of lesser diameter than that of the uppermost disk and consequently a greater throttling action occurs. As successive disks seat, greater and greater throttling action occurs. However, the minimum flame adjustment is such as to maintain the flame and prevent any chance of flash back, even if the throttle valve is completely closed and the gas has to pass through all of the openings in the disks, even including the smallest opening in the bottom disk.

If this minimum flame is still too much, the main valve closes with a quick motion. This quick motion results from the fact that as the main valve approaches its seat, the gas pressure below the main valve is relieved and this has the effect of a sudden downward thrust which insures quick closing of the main valve.

It will be seen, therefore, that in all forms of the invention a quick opening and quick closing main valve has been provided and throttling between the opened and closed position of the main valve through a substantial range of motion of the mechanism is also provided.

Further, in all forms of the invention it is clear that when the main valve is closed, the throttling assembly—whether of the balanced valve type, as shown in Figure 1, or of the other type, as shown in Figure 3—is out of the range of the gas pressure.

In all forms of the invention the throttling assembly is distinct and separate from the main valve.

In both Figures 1 and 3 it is to be noted that there is lost motion provided between the main valve and the throttling valve so that after the throttling valve is in its lowermost position, the main valve can still execute a limited motion. For instance, it can remain open and allow the minimum flame adjustment to function, or it can close without imparting any further motion to the throttling valve.

It is to be noted also that this invention provides a gradual or graduated throttling and that the throttling assembly, irrespective of which of the many forms the invention may take, insures throttling through a wide range of motion of the mechanism and avoids, on the one hand, the requirement for a very delicate adjustment and, on the other hand, any possible fluttering during this throttling action. The throttling action is positive and the throttling mechanism is not dependent on any delicate adjustment of the mechanism or any extreme accuracy in machining.

An additional feature to be noted is that in all forms of the invention there is considerable play not only vertically but laterally between the main valve and the throttling valve so that the throttling valve may independently adjust itself to its seat or guides and no binding whatsoever can occur.

It will be seen that this invention provides a very simple construction which is free from delicate parts, which does not require accurate adjustment, which provides a quick opening and closing main valve, and a throttling assembly or valve which operates through a very substantial range of motion of the mechanism.

Although this invention has been described in considerable detail, it is to be understood that such description is intended as illustrative rather than limiting, as the invention may be variously embodied and is to be interpreted as claimed.

I claim:

1. An automatic valve comprising a casing, a main diaphragm means within said casing, means for controlling said main diaphragm means, a main valve actuated by said main diaphragm means, throttling means actuated by said main diaphragm means, and a minimum flow means for providing a minimum flow when said throttling means is closed, said main valve cutting off flow of fluid to both said throttling means and said minimum flow means when said main valve is closed.

2. An automatic valve comprising a casing, diaphragm means within said casing, means for controlling said diaphragm means, a main valve actuated by said diaphragm means, throttling means actuated by said diaphragm means, said diaphragm means opening said main valve prior to the opening of said throttling means and closing said throttling means prior to the closing of said main valve, and a by-pass around said throttling means and controlled by said main valve, said by-pass permitting a minimum flow when said main valve is open but said throttling means is closed.

3. An automatic diaphragm valve comprising a casing provided with a diaphragm dividing said casing into two compartments, a main valve controlling the fluid flow, said diaphragm being subject to fluid pressure on one side thereof, restricted means for passing fluid pressure to the other side of said diaphragm, automatic pressure relief means for relieving the fluid pressure on one side of said diaphragm, said automatic means causing a floating action of said diaphragm, throttling means effective between open and closed positions of said main valve, said throttling means executing throttling action through a substantial range of motion of said diaphragm, said throttling means being out of the range of the inlet fluid pressure when said main valve is closed, and minimum flow means providing a minimum flow when said throttling means is in closed position, and said main valve is open, said minimum flow means being cut off when said main valve is closed.

4. An automatic valve comprising a casing, diaphragm means within said casing, means for controlling said diaphragm means, a main valve actuated by said diaphragm means with a quick movement, throttling means actuated by said diaphragm means, said throttling means being separate from said main valve and being effective when said main valve is open, said main valve cutting off all supply of fluid to said throttling means when said main valve is closed, and lost motion means between said diaphragm means and said throttling means.

5. In a device of the class described comprising a fluid flow supply, a fluid pressure operated quick motion main valve, means operatively supported and controlled by said main valve for graduating said fluid flow supply, and manual adjustable fluid flow means for supplementing the graduated flow, both means being controlled by said main valve.

6. In a device of the class described comprising a fluid flow supply, a fluid pressure operated quick motion main valve, means operatively supported and controlled by said main valve for graduating said fluid flow supply, a manual adjustable fluid flow means for supplementing the graduated flow, both means being controlled by said main valve, and pilot flow means controlling the operation of said main valve.

7. In a fluid flow valve device comprising a fluid pressure, diaphragm operated, quick motion main valve, means operatively supported and controlled by said main valve for graduating said fluid flow supply, a pressure operated diaphragm affecting the movement of said main valve and graduating flow means, manual adjustable fluid flow means for supplementing the graduated flow, both means being controlled by said main valve, and pilot flow means controlling the movement of said diaphragm.

8. A valve for providing a graduated fluid flow, said valve comprising a composite valve seat, a main valve cooperating with said valve seat, operating means for moving said main valve, and a plurality of perforated disks supported by and operated from said main valve and successively cooperating with said composite valve seat as said main valve is moved towards closed position, whereby a successively graduated flow is provided as successive perforated disks seat upon said composite valve seat.

9. A valve for providing a graduated fluid flow, said valve comprising a composite valve seat, a main valve cooperating with said valve seat, operating means for moving said main valve, and a plurality of perforated disks supported by and operated from said main valve and successively cooperating with said composite valve seat as said main valve is moved towards closed position, whereby a successively graduated flow is provided as successive perforated disks seat upon said composite valve seat, said main valve cutting off all flow of fluid to said perforated disks when said main valve is closed.

10. A valve for providing a graduated fluid flow, said valve comprising a composite valve seat, a main valve cooperating with said valve seat, operating means for moving said main valve, and a plurality of perforated disks supported by and operated from said main valve and successively cooperating with said composite valve seat as said main valve is moved towards closed position, whereby a successively graduated flow is provided as successive perforated disks seat upon said composite valve seat, said main valve cutting off all flow of fluid to said perforated disks when said main valve is closed, said perforated disks having lost motion with respect to said main valve.

11. In an automatic valve device of the class described for controlling fluid flow, comprising a main quick motion valve, means operatively controlled from said main valve for graduating said fluid flow, lost motion means between said main valve and said graduating means, and power means for operating said main valve, said power means imparting a quick opening and closing motion to said main valve while said lost motion means renders said graduating means ineffective, said graduating means coming into action after the quick opening of said main valve and ceasing while said main valve is open a substantial amount, said main valve when closed cutting off all flow to said graduating means.

12. In a pilot flow controlled valve device of the class described comprising a fluid flow supply, a fluid pressure operated quick motion main valve, means operatively controlled by said main valve for graduating said fluid flow supply, lost motion means between said main valve and said graduating means, said lost motion means allowing said main valve to operate with a quick motion without actuation of said graduating means, a single valve port, both said main valve and said graduating means controlling the flow through said single valve port, a supplementary flow means, both said graduating and said supplementary flow means being governed by said quick motion main valve.

13. In a fluid flow pilot controlled pressure operated quick motion valve having a fluid flow inlet and outlet and having a main valve port terminating in a main valve seat, said quick motion valve including a motive power diaphragm, said quick motion valve having a distance of travel between open and closed positions, and graduated fluid flow means slowly moved by said diaphragm and operating within the distance between open and closed positions of said valve, whereby said graduated flow means causes a gradual throttling between open and closed positions of said valve.

14. In a fluid flow pilot controlled pressure operated quick motion valve having a fluid flow inlet and outlet and having a main valve port terminating in a main valve seat, said quick motion valve including a motive power diaphragm, said quick motion valve having a distance of travel between open and closed positions, graduated fluid flow means slowly moved by said diaphragm and operating within the distance between open and closed positions of said valve, whereby said graduated flow means causes a gradual throttling between open and closed positions of said valve, and means controlled by said quick motion valve for causing a minimum flow when said graduated flow means is closed but said quick motion valve is open.

15. In a device of the class described, a pressure motor having a movable wall, a valve connected to said movable wall and operated thereby, means for varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, and means operative to permit a predetermined amount of free movement of said wall and said valve in opening direction and beyond the range of said free movement to offer progressively increasing resistance towards further movement of said wall to limit the movement of said wall to a position corresponding to the pressure differential on opposite sides thereof.

16. In a device of the class described, a pressure motor having a movable wall, a valve connected to said movable wall and operated thereby, means for varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, throttling means actuated by said movable wall, said throttling means being operative to offer a progressively increasing impedance to movement of said movable wall in valve opening direction so as to limit the movement of said wall to a position corresponding to the pressure differential on opposite sides thereof, and a lost motion connection between said movable wall and said throttling means whereby said wall is free to quickly move said valve to a partially open position before being subjected to the impedance offered by said throttling means.

17. In a device of the class described, a pressure motor having a movable wall, a valve connected to said movable wall and operated thereby, means for varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, and means operative to permit a predetermined amount of free movement of said wall and said valve in opening direction and beyond the range of said free movement to offer progressively increasing resistance towards further movement of said wall, said means comprising a plurality of weights, a supporting surface therefor, and connecting means between said wall and said weights effective upon movement of said wall in valve opening direction to cause said weights to be successively picked up after said predetermined amount of free movement.

18. In a device of the class described, a pressure motor having a movable wall, a valve connected to said movable wall and operated thereby, means for varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, throttling means comprising a plurality of spaced perforated valve discs, a valve seat therefor, and an operative connection between said wall and said discs permitting a predetermined amount of movement of said wall in opening direction independently of said discs, and after said predetermined movement being operative to cause said discs to be successively picked up so as to gradually increase the flow of fluid and to increase the bias towards closed position of said movable wall by reason of the weight of the discs.

19. In a throttling valve mechanism, a pressure motor having a diaphragm forming a movable wall for said motor, means for varying the relative pressure on opposite sides of said diaphragm to cause movement thereof, a valve seat member having a seating surface generally conical in shape, valve means seating on said conical valve seat along a plurality of spaced concentric annular lines, and means for connecting said diaphragm to said valve means, said connecting means being effective upon movement of said diaphragm in valve opening direction to move said valve means out of engagement with said valve seat along successive annular lines of contact, whereby a graduate flow is obtained.

20. In a throttling valve mechanism, a pressure motor having a movable wall, means for varying the relative pressure on opposite sides of said diaphragm to cause movement thereof, a valve seat, and a plurality of perforated discs supported by and operated from said movable wall and successively cooperating with said valve seat as said main valve is moved towards closed position, whereby a successively graduated flow is provided as successive perforated discs seat upon said valve seat.

21. In a fluid flow pilot controlled pressure operated quick motion valve having a fluid flow inlet and outlet, a valve port terminating in a valve seat, said quick motion valve having open and closed positions, graduated fluid flow means housed within said valve port and operated from said valve between open and closed positions, manual means supplementing said graduated flow means, and said quick motion valve governing the operation of both said means.

22. In a fluid flow pilot controlled pressure operated quick motion valve having a fluid flow inlet and outlet, a valve port terminating in a valve seat, said quick motion valve having a distance of travel between open and closed positions, graduated fluid flow means controlled by said valve and operating within said valve port within the said distance of travel between open and closed positions, manual means supplementing said grauated flow means, and said quick motion valve governing the operation of both said means.

23. In a fluid flow pilot controlled pressure operated diaphragm valve having a fluid flow inlet and outlet, a valve port terminating in a valve seat, said diaphragm valve having open and closed positions, a diaphragm, a valve connected thereto, means for causing a differential pressure to act upon said diaphragm to cause said valve to open and close with a quick motion, said valve having a distance of travel between open and closed positions, graduated fluid flow means controlled by said valve and operating in said valve port within said distance of travel between open and closed positions, lost motion means between said graduated flow means and said valve, said lost motion means allowing said valve to open and close with a quick motion without affecting said graduated fluid flow means, and manual means supplementing said graduated fluid flow means, said valve governing both said graduated flow means and manual supplementary flow means.

24. In a device of the class described, motor means, a main valve connected to said motor means, said motor means being operative to cause a quick movement of said valve between closed and open positions, means operatively supported and controlled by said main valve for graduating said fluid flow supply, and manually adjustable fluid flow means for supplementing the graduated flow, both means being controlled by said main valve.

25. In a device of the class described, a pressure motor having a movable wall, a valve connected to said movable wall and operated thereby, means for varying the pressure on one side of said wall to move said valve to and from closed position, said valve being of sufficient size and so disposed with respect to the path of fluid flow that the change in the pressure differential on opposite sides thereof in opening is effective to cause a quick movement thereof towards open position, and means effective to limit the movement of said wall corresponding to the pressure on said one side thereof whereby said means causes a gradual throttling between open and closed positions of said valve.

26. In a device of the class described, a pressure motor having a movable wall, a valve connected to said movable wall and operated thereby, means for varying the pressure on one side of said wall to move said valve to and from closed position, said valve being of sufficient size and so disposed with respect to the path of fluid flow that the change in the pressure differential on opposite sides thereof in opening is effective to cause a quick movement thereof towards open position, and means operative to offer progressively increasing resistance towards movement of said wall and said valve opening direction so as to limit the extent of such quick movement and to limit the final position of said wall to a position determined by the pressure on said one side thereof.

27. In a device of the class described, a pressure motor having a movable wall, a valve connected to said movable wall and operated thereby, means for varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, and means operative to offer progressively increasing resistance towards movement of said wall and said valve in valve opening direction so as to limit the extent of said quick movement and to limit the final position of said wall to a position corresponding to the pressure differential on opposite sides thereof.

28. In a device of the class described, a pressure motor having a movable wall, a valve connected to said movable wall and operated thereby, means for varying the pressure on one side of said wall to move said valve to and from closed position, said valve being of sufficient size and so disposed with respect to the path of fluid flow that the change in the pressure differential on opposite sides thereof in opening is effective to cause a quick movement thereof towards open position, throttling means effective to limit the movement of said wall corresponding to the pressure on said one side thereof whereby said throttling means causes a gradual throttling between open and closed positions of said valve, and means controlled by said valve for causing a minimum flow when said throttling means is closed but said valve is open.

29. In a fluid flow pressure operated device, a quick motion main valve having on and off positions, a throttling valve, and pressure means for operating said valves and utilizing the valved fluid as the pressure fluid therefor, said device having inlet and outlet portions, said throttling valve being located between the outlet portion and said main valve to thereby be effective in building up back pressure acting upon the pressure means for operating the main valve.

30. In a fluid flow pressure operated device, a quick motion main valve having on and off positions, a throttling valve, pressure means for operating said valves and utilizing the valved fluid as the pressure fluid therefor, said device having inlet and outlet portions, said throttling valve being located between the outlet portion and said main valve to thereby be effective in building up back pressure acting upon the pressure means for operating the main valve, and a single bleed line controlling the operation of both valves.

31. In a valve mechanism for controlling a fluid flow, a casing, diaphragm means within the casing, means for variably applying the pressure of the fluid being valved to the pressure faces of said diaphragm means, a main valve connected to said diaphragm means and operated thereby with a quick movement, a throttling valve also connected to said diaphragm means for graduating said fluid flow supply, and a manually adjustable by-pass around the throttling valve for supplementing the graduated flow, the fluid flow through both said throttling means and said manually adjustable means being controlled by said main valve.

32. In combination, a gas burner, a fluid fuel supply therefor, a shut-off valve controlling said supply, a throttling valve in said supply between said shut-off valve and said burner, means responsive to a first condition for causing said shut-off valve to move relatively quickly to either an open or closed position depending upon the value of said condition, a diaphragm for actuating said throttling valve, means for applying gas pressure to said diaphragm, means responsive to a second condition for gradually varying said gas pressure to vary the position of said throttling valve, and an adjustable minimum flow by-pass around said throttling valve and controlled by said shut-off valve.

33. In combination, a gas burner, a fluid fuel supply therefor, a shut-off valve controlling said supply, a throttling valve in said supply between said shut-off valve and said burner, an electrically operated device for causing said shut-off valve to move relatively quickly to either an open or closed position depending upon the energization of said device, condition responsive means controlling the energization of said device, a diaphragm actuating said throttling valve, means responsive to a second condition for gradually varying the relative pressure on opposite sides of said diaphragm to gradually vary the position of said throttling valve, and a minimum flow by-pass around said throttling valve and controlled by said shut-off valve.

34. In combination, a gas burner, a fluid fuel supply therefor, a shut-off valve controlling said supply, a throttling valve in said supply between said shut-off valve and said burner, an electrically operated device for causing said shut-off valve to move relatively quickly to either an open or closed position depending upon the energization of said device, temperature responsive means controlling the energization of said device, a diaphragm actuating said throttling valve, restricted means for admitting fuel from said supply to one side of said diaphragm, means responsive to a second condition for gradually varying the escape of said fuel from said one side of said diaphragm thereby to vary the pressure on said diaphragm and the position of said throttling valve, and a minimum flow by-pass around said throttling valve and controlled by said shut-off valve.

FRANK A. GAUGER.

CERTIFICATE OF CORRECTION.

Patent No. 2,207,978. July 16, 1940.

FRANK A. GAUGER.

It is hereby certified that error appears in the printed specification of the above numbered patent requiring correction as follows: Page 6, first column, line 29, claim 19, for the word "graduate" read --graduated--; and second column, line 46, claim 26, for "valve opening" read --valve in valve opening--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.